United States Patent
Yanagawa et al.

(10) Patent No.: US 7,853,052 B2
(45) Date of Patent: Dec. 14, 2010

(54) FACE IDENTIFICATION DEVICE

(75) Inventors: Yukiko Yanagawa, Nara (JP); Miharu Sakuragi, Kyoto (JP); Yoshihisa Minato, Kyoto (JP)

(73) Assignee: Omron Corporation, Kyoto (JP)

( * ) Notice: Subject to any disclaimer, the term of this patent is extended or adjusted under 35 U.S.C. 154(b) by 942 days.

(21) Appl. No.: 11/708,024

(22) Filed: Feb. 20, 2007

(65) Prior Publication Data
US 2007/0196001 A1 Aug. 23, 2007

(30) Foreign Application Priority Data
Feb. 22, 2006 (JP) .............................. 2006-045723

(51) Int. Cl.
*G06K 9/00* (2006.01)
(52) U.S. Cl. ..................... 382/118; 382/190; 382/228
(58) Field of Classification Search ................ 382/118, 382/190, 228, 276
See application file for complete search history.

(56) References Cited

U.S. PATENT DOCUMENTS

| | | | |
|---|---|---|---|
| 6,480,841 B1 * | 11/2002 | Higashio et al. ................... 1/1 |
| 6,628,811 B1 * | 9/2003 | Nagao et al. ................ 382/118 |
| 7,092,555 B2 * | 8/2006 | Lee et al. ..................... 382/118 |
| 2004/0197013 A1 * | 10/2004 | Kamei ........................ 382/118 |
| 2005/0117783 A1 * | 6/2005 | Sung et al. .................. 382/118 |
| 2007/0196001 A1 * | 8/2007 | Yanagawa et al. ........... 382/118 |
| 2009/0097717 A1 * | 4/2009 | Chung et al. ................ 382/118 |

FOREIGN PATENT DOCUMENTS

| JP | 2002-024830 | 1/2002 |
|---|---|---|
| JP | 2005-202673 | 7/2005 |

OTHER PUBLICATIONS

"Subspace Face Recognition for Reducing Lighting Fluctuations," Matsuo, Kenji, Hashimoto, Masayuki and Koike, Atsushi, KDDI R&D Laboratories Inc., Saitama, Japan, Email: matsuo, masayuki, koike@kddilabs.jp.
Xie, et al. "Face Recognition Under Varying Illumination Based on a 2D Face Shape Model." *Pattern Recognition*, vol. 38, No. 2, p. 221-230, Feb. 1, 2005.
Beymer, et al. "Face Recognition From One Example View." *Proceedings of the Fifth International Conference on Computer Vision*. Cambridge, MA., Jun. 20-23, 1995. vol. 5, p. 500-507. Jun. 20, 1995.

* cited by examiner

*Primary Examiner*—Gregory M Desire
(74) *Attorney, Agent, or Firm*—Dickstein Shapiro LLP (57) ABSTRACT

A face feature value vector extracting section extracts a feature value from a registered image of a registrant to generate a face feature value vector. A virtual face feature value vector generating section converts the face feature value vector using a feature value converter which performs a conversion in a feature value space. Then, a registration information generating section generates face definition information of the registrant based on a face feature value vector before conversion and a virtual face feature value vector after conversion and registers this information in a registration information storing section.

8 Claims, 4 Drawing Sheets

DETERMINED AS MR. B
→ ERRONEOUS DETERMINATION

FIG. 4B

CORRECTLY
DETERMINED AS MR. A

FACE IDENTIFICATION DEVICE

This application claims priority to Japanese Application No. 2006-045723, filed on Feb. 22, 2006, which is hereby incorporated by reference in its entirety.

BACKGROUND

1. Field of the Invention

The present invention relates to face identification devices and to technology for registering a face in a face identification device.

2. Description of the Related Art

In a face identification device based on face recognition technology, an image is used for face registration (teaching) and identification, and therefore differences in imaging conditions of the image used for registration and identification (illumination, face direction, expression, age, etc.) largely affects identification accuracy. In order to secure robustness with respect to differences in such imaging conditions, it is generally preferable that image registration is performed using a large number of images imaged under various conditions.

However, imaging under various conditions imposes a heavy burden on users who perform face registration. Further, it is difficult to achieve desirable imaging conditions. Furthermore, there is a need to readily perform face registration using a small number of images (for example, ID photos adhered on licenses, passports, etc.).

Conventional methods and devices have attempted to address these problems in various ways. First, there is proposed a method in which surface reflectivity is used for face identification by estimating the surface reflectivity of a face from an input face image and an average face three-dimensional shape model, or an image under arbitrary illumination conditions from which the surface reflectivity is generated (see, Japanese Patent Application Laid-Open No. 2002-24830). This method corresponds to illumination change by using surface reflectivity, which is a parameter less susceptible to illumination conditions.

Although JP 2002-24830 considers surface reflectivity (under various illumination conditions) when performing registration, the method lacks versatility because it cannot correspond to other than fluctuation of the illumination conditions and the feature value used for face identification is limited to the surface reflectivity, etc. Furthermore, the face three-dimensional shape model is used and a conversion process based on the image is performed; therefore, there is a disadvantage that an amount of memory capacity and calculation cost become enormous.

Next, in face image recognition according to a subspace method, there is proposed a method in which an autocorrelation matrix R' of an image obtained under other illumination conditions is virtually made by adding a covariance matrix C in an illumination standard space which is a fluctuation element model the of illumination conditions with respect to an autocorrelation matrix R of a registered image obtained under certain illumination conditions (refer to Japanese Patent Application Laid-Open No. 2005-202673, and Kenji Matsuo and two others, "Face Image Recognition Suppressing Illumination Fluctuation Due to Virtual Part Space," TECHNICAL REPORT OF IEICE, THE INSTITUTE OF ELECTRONICS, INFORMATION AND COMMUNICATION ENGINEERS, Jun. 18, 2004, Vol. 104, No. 125, pp. 25-30).

JP 2005-202673 is specialized to image recognition technology using the subspace method and therefore lacks versatility. Furthermore, since an eigenvalue problem cannot be solved in one dimension (in other words one sheet of registered image), a plurality of sheets of the registered images is needed (for example, 50 sheets of images are used in the above-mentioned document written by Matsuo, et al.). Even when the illumination condition is limited to one kind, if several tens of sheets of images need to be imaged, the amount of processing required remains relatively the same and the amount of memory and calculation costs increase.

SUMMARY

One object of the present invention is to provide technology capable of performing face registration of high reliability even using only a few images. Furthermore, another object of the present invention is to provide technology with excellent versatility, capable of performing face registration of high reliability even using only a few images with a small memory capacity and calculation cost.

A face identification device of the present invention includes a storing unit capable of storing face definition information which defines a face of a registrant; a identifying unit which performs face identification of a target to be identified by comparing feature value extracted from a face image of the target to be identified with the face definition information in the storing unit; and a registering unit which generates face definition information of a new registrant and registers in the storing unit.

In the face identification device according to one aspect of the invention, the registering unit includes a feature value extracting unit which extracts feature value from a face image of the new registrant; a feature value converting unit which converts a vector constituted by the extracted feature value using a converter which performs coordinate conversion in a feature value space; and a face definition information generating unit which generates the face definition information of the new registrant based on the extracted feature value and feature value constituting a vector after conversion.

In this case, "feature value" means parameters representing face feature capable of extracting from images. Users can arbitrarily set what type of feature value to select or how much feature value to use. "Feature value space" means multidimensional space having each dimension for each feature value in the axis. The feature value extracted from the face image is set as a point in the feature value space. In this specification, a group of the feature value is defined as "vector" or "face feature value vector" for descriptive purposes. "Converter" performs coordinate conversion in the feature value space. The coordinate conversion can be expressed as a geometric conversion matrix, for example, there are vector enlargement, contraction, rotation, and displacement.

Furthermore, in the face identification device according to an aspect of the invention, the converter may be for converting a vector of feature value obtained from a face image imaged under a first condition to a vector of feature value obtained from a face image of an identical person imaged under a second condition different from the first condition.

In this case, "condition" means various conditions capable of affecting on the feature value extracted from the image, for example, it can include illumination (luminance), face direction, facial expression, age, makeup method, presence or absence of attachment (eyeglasses, mask, etc.), hair pattern, image resolution, etc.

Further, in the face identification device according to another embodiment of the invention, when the original vector is set to $V1$ and the vector after conversion is set to $V2$, for example, the converter may be calculated as shown in equation 1. Depending on setting of coefficient matrixes A and B, it can correspond to various types of coordinate conversion (it may also be said as conversion of imaging conditions).

$$V2 = A \cdot V1 + B \quad \text{[Equation 1]}$$

A, B: Coefficient matrix

Any reasonable method may be used for setting coefficient matrices A and B. Each value of the coefficient matrix can be inputted by a person; and change of the feature value due to change in conditions can be calculated by computation simulation. Furthermore, each face image of the first condition and the second condition on a plurality of persons can be prepared and the coefficient matrix is calculated from a plurality of those face images using a statistical method.

For example, in the face identification device according to yet another embodiment of the invention, when the vector of the feature value obtained from the face image imaged under the first condition of an i-th person is set to Vai and the vector of the feature value obtained from the face image imaged under the second condition of the i-th person is set to Vbi, the coefficient matrixes A and B are calculated from face images of N number of persons by using a statistical method and may be calculated as shown in equation 2.

$$A = E \quad \text{[Equation 2]}$$
$$B = \frac{\sum_i^N Va_i - Vb_i}{N}$$

where, $E$: Unit matrix $N$, $i$: Integer number meeting $1 \le i \le N$

Alternatively, in the face identification device according to an embodiment of the invention, the coefficient matrixes A and B may be calculated as shown in equation 3.

$$A = \frac{Sab}{Saa} \quad \text{[Equation 3]}$$
$$B = \overline{Vb} - \overline{Va}$$

where, N, i: Integer number meeting $1 \le i \le N$ $$Saa = \sum_i^N (Va_i - \overline{Va})^2$$
$$Saa = \sum_i^N (Va_i - \overline{Va})(Vb - \overline{Vb})$$
$$\overline{Va} = \frac{\sum_i^N Vai}{N}$$
$$\overline{Vb} = \frac{\sum_i^N Vbi}{N}$$

Furthermore, in the face identification device according to another aspect of the invention, it may be that the feature value converting unit converts the original vector to a plurality of vectors, and the face definition information generating unit generates the face definition information of the new registrant based on the extracted feature value and the feature value constituting the plurality of vectors after conversion. Thereby, a face of the new registrant can be more accurately defined.

One embodiment of the present invention may be a face identification device which has at least a part of the above-mentioned means, or it may be a face registration device for registering a face in the face identification device. Furthermore, one embodiment of the present invention may be a face registration method which has at least a part of the above-mentioned process, or it may be a program for actualizing such method and a recording medium in which the program is recorded. Further, one embodiment of the present invention may be a converter generating device and a converter generating method, for generating a converter for use in a face registration device and a face registration method. In addition, each of the above-mentioned means and processes may be combined in the present invention.

For example, one aspect of the present invention is a face registration method for registering a face of a new registrant with respect to a face identification device provided with a storing unit capable of storing face definition information which defines a face of a registrant, for performing face identification of a target to be identified by comparing feature value extracted from a face image of the target to be identified with the face definition information in the storing unit. The face registration method includes the steps, which are performed by an information-processing device, of: extracting feature value from a face image of a new registrant; converting a vector constituted by the extracted feature value using a converter which performs coordinate conversion in a feature value space; generating the face definition information of the new registrant based on the extracted feature value and feature value constituting a vector after conversion; and registering the generated face definition information in the storing unit of the face identification device.

Further, another aspect of the present invention is a program for registering a face of a new registrant with respect to a face identification device provided with a storing unit capable of storing face definition information which defines a face of a registrant, for performing face identification of a target to be identified by comparing feature value extracted from a face image of the target to be identified with the face definition information in the storing unit. The program includes the processes, which are executed by an information-processing device, of: extracting feature value from a face image of a new registrant; converting a vector constituted by the extracted feature value using a converter which performs coordinate conversion in a feature value space; generating the face definition information of the new registrant based on the extracted feature value and feature value constituting a vector after conversion; and registering the generated face definition information in the storing unit of the face identification device.

According to current embodiments of the present invention, face registration of high reliability can be performed even using a few images. Additionally, given its small memory capacity and calculation cost and excellent versatility, aspects of the present invention can be applied to various types of face identification devices.

DETAILED DESCRIPTION

Figure 1:
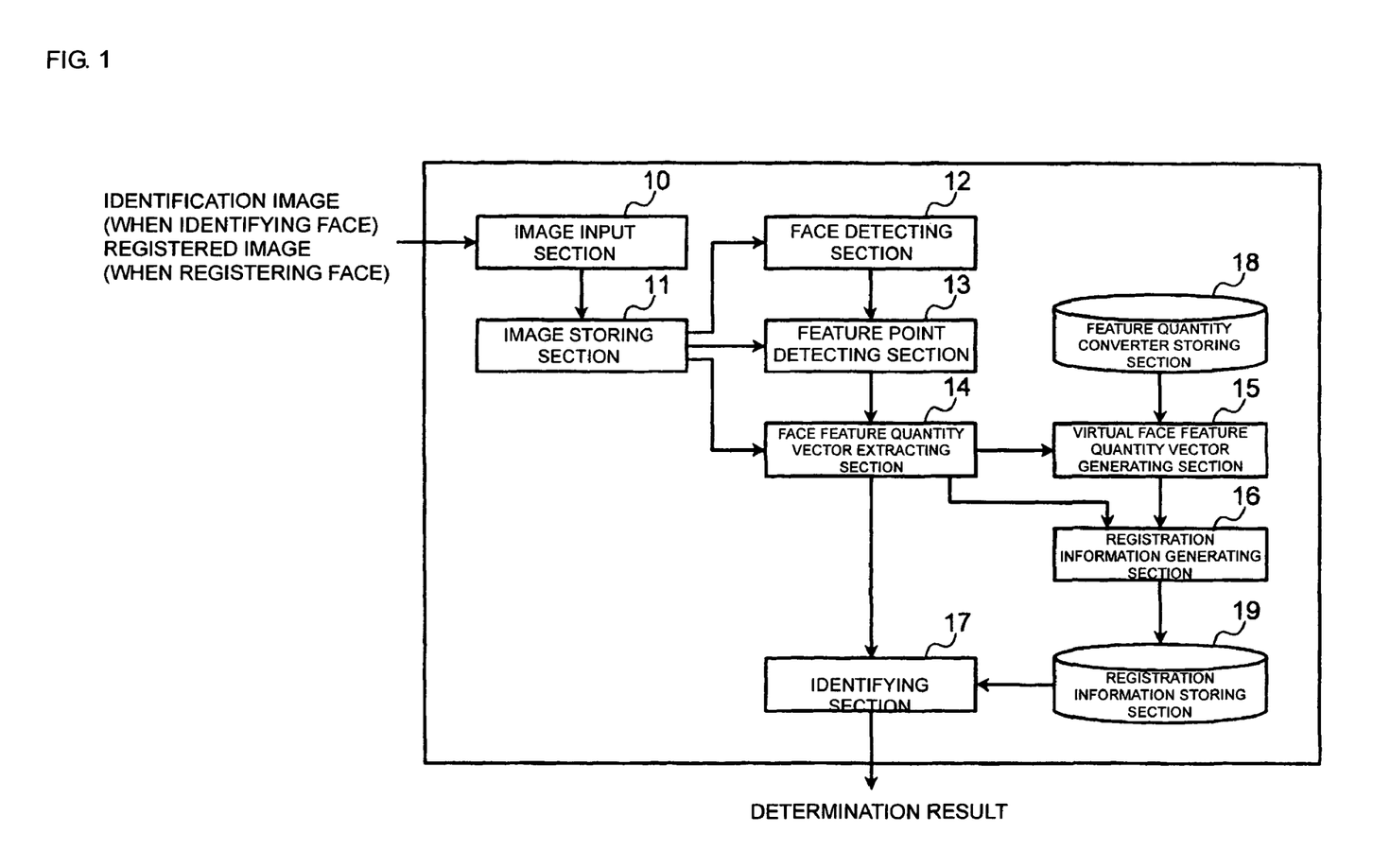
FIG. 1 shows a block diagram of a functional configuration of a face identification device.

Referring to the drawings, embodiments of the present invention will be described in detail below. FIG. 1 shows a block diagram of a functional configuration of a face identification device according to an embodiment of the invention. The face identification device is a device for performing personal authentication or personal identification of a target to be identified using a face image. The face identification device can be applied to various use applications, for example, a computer with a camera, a security device in a mobile phone, a monitor device for performing intruder detection, and a device for entering and leaving control and performing door lock control.

The face identification device includes a plurality of functional elements shown in FIG. 1, that is, an image input section 10, an image storing section 11, a face detecting section 12, a feature point detecting section 13, a face feature value vector extracting section 14, a virtual face feature value vector generating section 15, a registration information generating section 16, an identifying section 17, a feature value converter storing section 18, and a registration information storing section 19. In the present embodiment, an arithmetic processing unit executes software (program) and controls hardware resources such as a storage device, an imaging device, and an input device according to need, whereby these functional elements are normalized. In this regard, however, these functional elements may be configured by chips for exclusive use. The face identification device actualizes two main functions of "identification function" and "registration function" by appropriately combining these functional elements. Each of the main functions will be described in detail below.

The identification function is a function for performing face identification of a target to be identified by comparing feature value extracted from a face image of a target to be identified with face definition information of a (pre-registered) registrant. In the present embodiment, the identification function includes the image input section 10, the image storing section 11, the face detecting section 12, the feature point detecting section 13, the face feature value vector extracting section 14, the identifying section 17, and the registration information storing section 19.

The number of registrants (face definition information) which can be registered in the image storing section 11 may be only one registrant or a plurality of registrants. Furthermore, face identification by the identification function may be identical person authentication (one-to-one identification) which confirms whether or not the target to be identified is the identical person, or personal identification (identification of one to many) which identifies who the target to be identified is.

Figure 2:
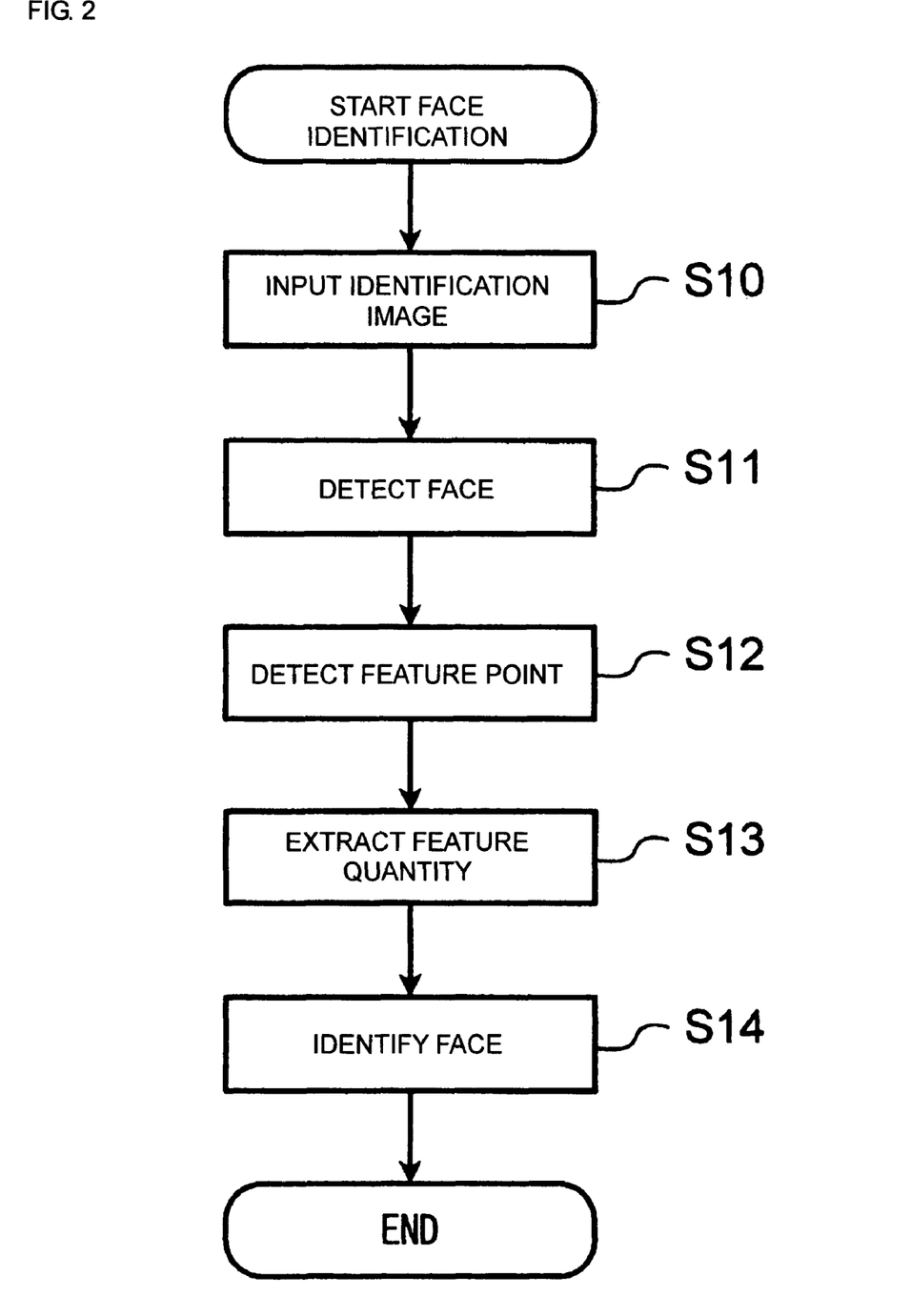
FIG. 2 shows a flow chart of a process flow of an identification function.

A configuration of the identification function and a process flow will be described according to a flow chart shown in FIG. 2.

When the identification function starts, the face image of the target to be identified (referred to as "identification image" below) is inputted from the image input section 10 (step S10). The inputted identification image is stored in the image storing section 11.

The image input section 10 is an interface for inputting an image to the face identification device and it may be configured using any existing technology. For example, in a case where the image is inputted via a network, a network interface corresponds to the image input section; in a case where the image is inputted from external devices such as a digital camera, a scanner, a computer, a storage device, etc., a communication interface in which the external devices and the face identification device are connected with wire or wireless corresponds to the image input section; and in a case where the image is inputted from a recording medium such as a memory, CD, DVD, etc., a reader of the recording medium corresponds to the image input section. Furthermore, if the face identification device is equipped with the imaging device composed of a CCD, CMOS sensor, etc. and a target is imaged by the imaging device, the imaging device corresponds to the image input section.

The image storing section 11 is a storage device for temporarily storing the image to be processed. As the storage device, any concrete technology such as a volatile memory, a nonvolatile memory, etc. may be applied.

Next, the face detecting section 12 detects a person's face from the identification image and specifies a face position, size, etc. (step S11).

Any existing technology may be applied to a face detection process by the face detecting section 12. As examples, there are as follows: (1) a method for detecting a face by template matching using a reference template corresponding to an outline of the whole face; (2) a method face for detecting a face by template matching based on parts of the face (such as an eye, nose, ear, etc.); (3) a method for detecting the top point of the head, etc. by a chroma-key process and a face is detected based on the top point; (4) a method for detecting an area nearly corresponding to a skin color and the area is detected as a face; (5) a method for performing learning according to a teacher signal using a neural network and an area supposed to be a face is detected as the face, etc. The face is not automatically detected, but a person may specify a face position and size. In addition, in a case where a plurality of faces is detected from the image, a face to be processed may be decided based on a face size, direction, position, etc.

Next, the feature point detecting section 13 detects a plurality of feature points from the face detected by the face detecting section 12 (step S12). The feature point is a point which is set as an extraction standard of the feature value and it is previously decided which point in the face is selected as the feature point. For example, a plurality of points such as the center of the eye, the top (or tip) of the nose, the edges of the mouth, etc. are selected as the feature point.

Any existing technology may be applied to a feature point detection process by the feature point detecting section 13. To take examples, there are as follows: (1) a method for detecting the feature point by previously learning patterns showing positions of the feature point and by performing matching using the learning data; and (2) a method in which, in the inner side of a detected face, end points of the parts of the face are detected by performing edge detection and pattern matching and the feature point is detected using the end points as the standard. The feature point is not automatically detected, but a person may specify parts of the face or a position of the feature point.

Next, the face feature value vector extracting section 14 extracts the feature value based on the detected feature point (step S13). Any type of the feature value may be used. For example, contrasting value near the feature point, its periodicity, directionality, relationship of position of the feature point, etc. may be used as the feature value. The number of the feature value may also be arbitrarily set according to expecting identification accuracy. Generally, several tens to several hundreds of the feature value are extracted. A group of the feature value extracted from the image in such manner is referred to a face feature value vector. It can be said that the face feature value vector is one in which the face feature is quantified. A tendency (direction and size) of the face feature value vector differs depending on a person, as the face feature differs depending on a person.

The identifying section 17 performs face identification by comparing the face feature value vector obtained from the identification image with registrant face definition information registered in the registration information storing section 19 and its determined result is outputted (step S14). In addition, the face definition information of one or a plurality of registrants is previously registered in the registration information storing section 19. It can be said that the face definition information is one which defines a face of a registrant (in other words, the tendency of the face feature value vector extracted from the face of the registrant).

Any existing technology may be applied to a face identification process by identifying section 17. For example, in a case of personal authentication, degree of similarity between the face feature value vector of the identification image and the face definition information of the registrant (identical person) is calculated; and when the degree of similarity is larger than a predetermined threshold, it may be determined as the identical person. In a case of personal identification, the degree of similarity for each of a plurality of the registrants is calculated; and it may be determined that the target to be identified corresponds to which registrant based on the degree of similarity.

Accuracy of the face identification in the identifying section 17 is largely dependent on accuracy (reliability) of the face definition information. Now, registration function assuming generation and registration of the face definition information will be described next.

<Registration Function>

The registration function generates face definition information of a new registrant and registers it in the device. In the present embodiment, the registration function includes the image input section 10, the image storing section 11, the face detecting section 12, the feature point detecting section 13, the face feature value vector extracting section 14, the virtual face feature value vector generating section 15, the registration information generating section 16, and the feature value converter storing section 18.

Figure 3:
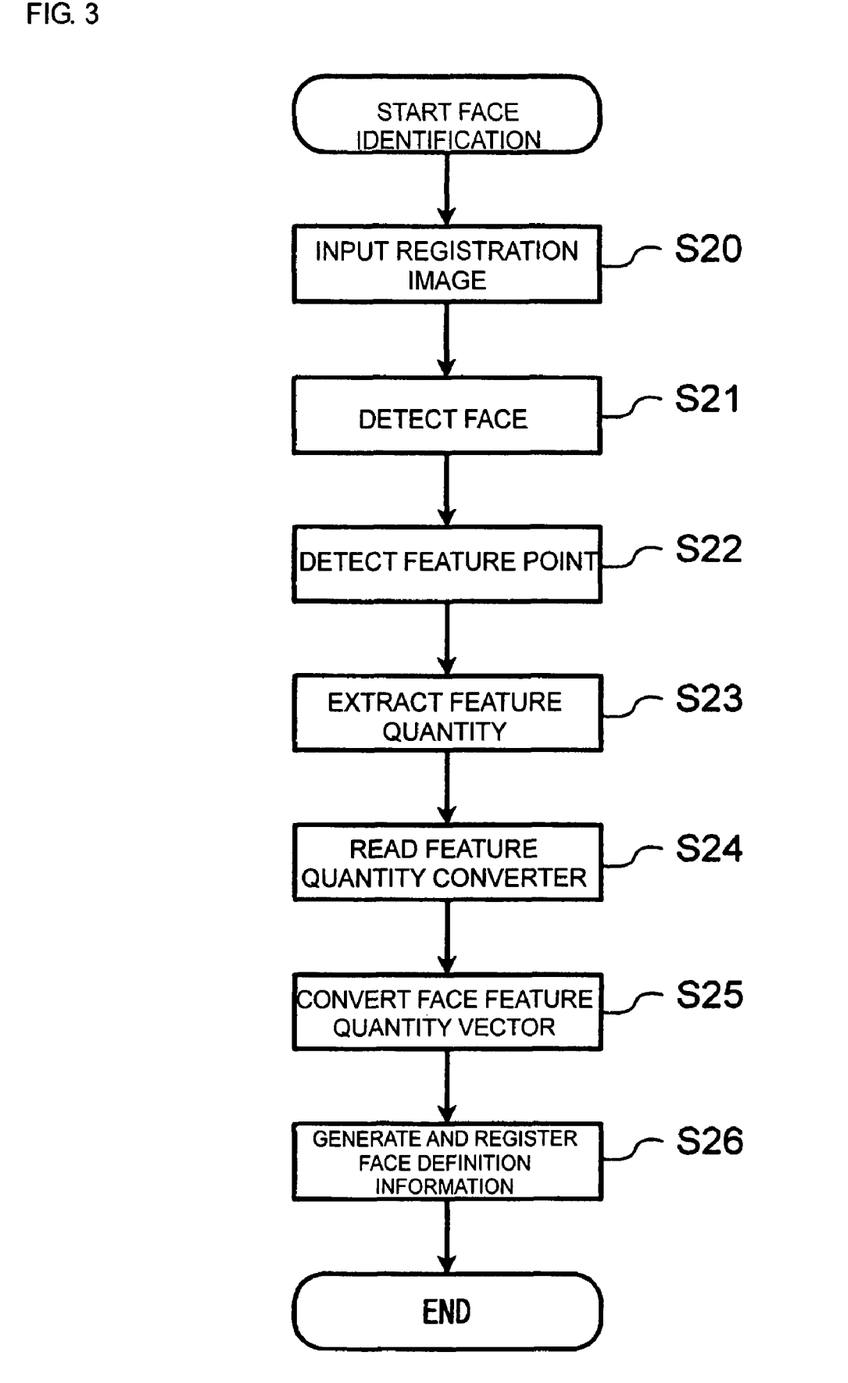
FIG. 3 shows a flow chart of a process flow of a registration function.

A configuration and a process flow of the registration function will be described according to a flow chart shown in FIG. 3.

When the registration function starts, a face image (referred to as "registered image" below) of the new registrant is inputted from the image input section 10 (step S20). The inputted registered image is stored in the image storing section 11.

Then, the face detecting section 12 detects a human face from the registered image, the feature point detecting section 13 detects the feature point, and the face feature value vector extracting section 14 calculates the face feature value vector of the new registrant (steps S21 to S23). Successive processes extracting the feature value from the face image are the same as those in the face identification.

Next, the virtual face feature value vector generating section 15 reads a corresponding feature value converter from the feature value converter storing section 18 (step S24); and the face feature value vector obtained in step S23 is converted using the feature value converter (step S25).

The feature value converter performs coordinate conversion in a feature value space. When the face feature value vector is respectively calculated from two sheets of face images imaging the identical person, if imaging conditions of both images are the same, the tendency (direction and size) of the face feature value vector becomes almost the same. However, imaging conditions (for example, illumination, face direction, expression, age, makeup method, presence or absence of attachment, hair pattern, image resolution, etc.) are different, difference in the tendency corresponding to difference in the conditions appears in the face feature value vector. The coordinate conversion by the feature value converter virtually requires a change in the face feature value vector due to the difference in such imaging conditions. In other words, it can be said that the feature value converter is one in which the face feature value vector obtained from the face image imaged under a certain condition is converted to the face feature value vector obtained from the face image of the identical person imaged under a different condition. Hereinafter, conditions and vectors will be referred to as follows: the conditions before change will be called as "former conditions"; the conditions after change will be called as "virtual conditions"; the face feature value vector before conversion will be called as "original vector" and the face feature value vector after conversion will be called as "virtual vector."

Conversion characteristics of the feature value converter are dependent on a combination of the former conditions and the virtual conditions. However, countless imaging conditions are assumed and therefore it is not realistic that every combination of the former conditions and the virtual conditions is included. Consequently, in the present embodiment, a plurality of typical combinations of the former conditions and the virtual conditions are selected and the feature value converter for each combination is created in advance (a likely creation method will be described later) to store in the feature value converter storing section 18. In step S24, the virtual face feature value vector generating section 15 selects a converter, which has the same former conditions as the imaging conditions of the registered image, from a plurality of feature value converters in the feature value converter storing section 18 to generate a virtual vector.

According to this configuration, by only imaging the new registrant under a first condition, it can be obtained not only the feature value under the first condition from the face image but also the feature value to be obtained in a case of imaging under a second condition. That is, the feature value under a plurality of imaging conditions can be obtained from one registered image. The face definition information is generated from the feature value under the plurality of imaging conditions, thereby improving robustness with respect to the difference in the imaging conditions, whereby face identification of high reliability can be performed.

In addition, various methods for specifying the imaging conditions of the registered image can be considered. For example, as for illumination conditions, as "interior/exterior" and "bright/dark"; and as for a face direction, as "front-facing/oblique direction/transversal direction," a plurality of conditioned nominations may be presented so as to make a user input conditions. Alternatively, imaging conditions may be automatically determined based on the feature value obtained from the registered image.

One or a plurality of virtual vectors is generated from the original vector by the above-mentioned process, the registration information generating section 16 generates the face definition information of the new registrant based on the original vector and the virtual vector (in other words, based on the feature value directly extracted from the registered image and the feature value after conversion) and registers it in the registration information storing section 19 (step S26).

The registration information generating section 16, in addition to the feature value directly extracted from one face image, generates the face definition information also using the feature value after conversion converted from the feature value and therefore accuracy of the face definition information can be improved, as compared with generating the face definition information only from the directly extracted feature value. Consequently, (of course, also in a case of using multiple registered images) the present embodiment can perform face registration of high reliability even using a few registered images such as one or several sheets.

The thus generated face definition information considers not only the imaging conditions of the registered image (former conditions) but also other imaging conditions (virtual conditions). Therefore, accuracy of the face definition information can be improved as compared with generating the face definition information only from the original vector; and consequently, decision accuracy of the face identification can be improved.

Figure 4A:
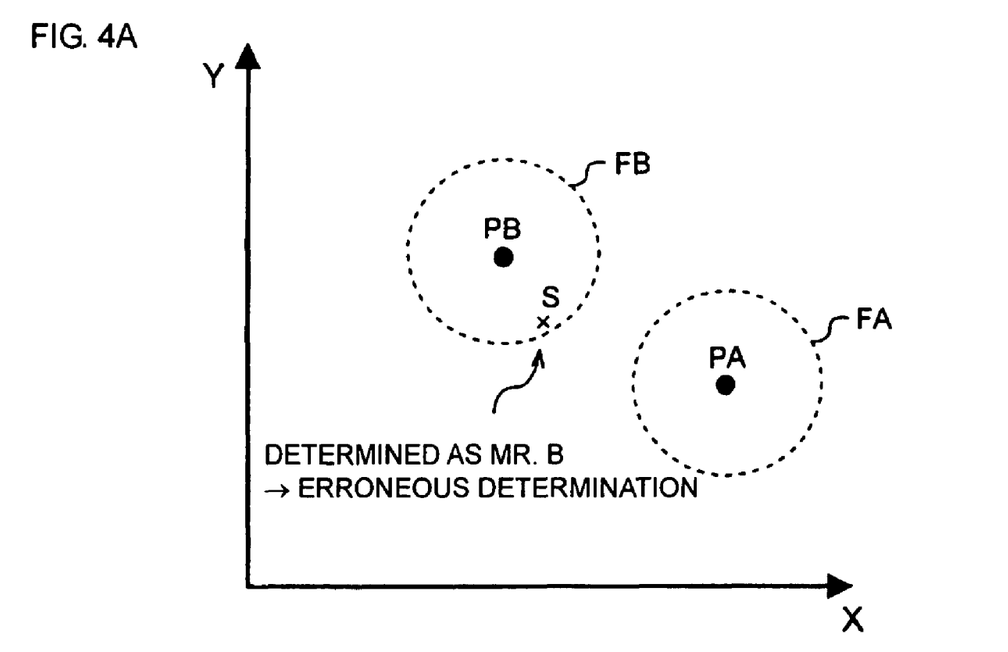
FIG. 4A shows a view of an erroneous determination when face definition information is generated only from an original vector.
Figure 4B:
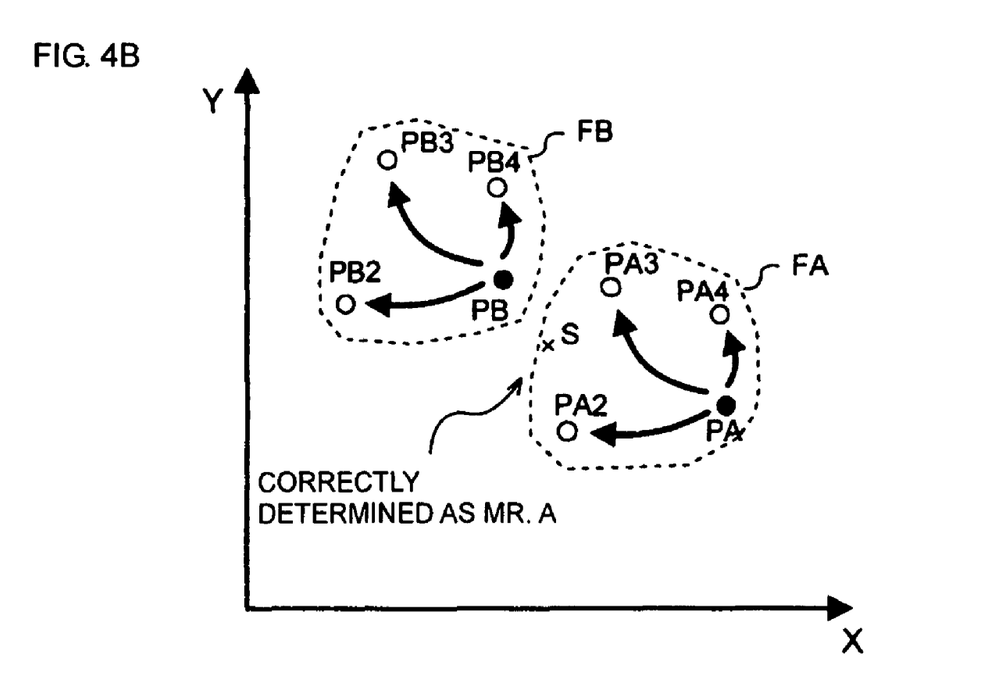
FIG. 4B shows a view of a determination when the face definition information is generated from the original vector and a virtual vector.

There is shown an accuracy comparison between a case where the face definition information is generated only from the original vector as shown in FIG. 4A and a case where the face definition information is generated from the original vector and the virtual vector as shown in FIG. 4B. FIGS. 4A and 4B exemplify, cases where face registration of Mr. A and Mr. B is performed using the registered image imaged under a condition 1, and then face identification of Mr. A is performed under a separate condition. Referring to the drawings, PA denotes the original vector obtained from the registered image of Mr. A; PAx denotes the virtual vector generated from the original vector PA; and FA denotes the face definition information of Mr. A. PB denotes the original vector obtained from the registered image of Mr. B; PBx denotes the virtual vector generated from the original vector PB; and FB denotes the face definition information of Mr. B. S denotes the face feature value vector obtained from the identification image of Mr. A. In this case, although two-dimensional feature value space composed of two feature values of X and Y is shown in order to make the explanation understandable, several tens to several hundreds dimensional feature value space may be used in the actual device.

The original vectors PA and PB obtained from the registered image are merely one point on the feature value space; and therefore, it is difficult to decide accurate interpolation of the face definition information FA and FB only from the original vectors PA and PB. Consequently, when face identification is performed using an identification image imaged under a condition different from the registered image, there is a possibility to be erroneously determined that it is a face of Mr. B in spite of a identification image of Mr. A, as shown in FIG. 4A.

On the other hand, as shown in FIG. 4B, when virtual vectors PA2 to PA4 and PB2 to PB4 under conditions 2 to 4 are generated from the original vectors PA and PB under the condition 1 and face definition information FA and FB are generated from face feature value vectors under a plurality of those conditions, more accurate interpolation can be decided. Thereby, robustness with respect to difference in imaging conditions can be increased, and correct determination can be performed even using the identification image under conditions different from the registered image.

In the method according to the present embodiment, fluctuation of the imaging conditions is normalized by a simple process (feature value based conversion process) that is coordinate conversion of the face feature value vector (in other words, feature value based conversion process). Consequently, memory capacity and calculation cost can be largely reduced as compared with a conventional image based conversion process. Additionally, the process that is the coordinate conversion of the face feature value vector is not dependent on the type of the feature value and the method (algorithm) of the face registration and the face identification and therefore it can be generally applied to overall face identification technology using the feature value.

<Feature Value Converter>

When the original face feature value vector is set to V1 and the face feature value vector after conversion is set to V2, the feature value converter is represented as shown in the following equation.

$$V2 = A \cdot V1 + B \qquad \text{[Equation 4]}$$

A, B: Coefficient matrix

The coefficient matrixes A and B can be applied to various types of the coordinate conversion depending on setting thereof. Although a calculation method of the coefficient matrixes A and B is no object, in this case, two methods for calculating the coefficient matrixes A and B using a statistical method from the face images of N number of persons prepared according to the conditions are exemplified. The former conditions are referred to as a "first condition" and the conditions after change are referred to as a "second condition" below.

A first method is a method for requiring a coefficient matrix using average of an amount of movement of the face feature value vector caused by condition change.

First, a face image imaged under the first condition and a face image imaged under the second condition are prepared for each sample of N number of persons. The face feature value vector is required from those face images. The calculation method of the face feature value vector is the same as those shown in FIG. 2 and FIG. 3.

When the feature value vector obtained from the face image imaged under the first condition of an i-th person is set to Vai and the feature value vector obtained from the face image imaged under the second condition of the i-th person is set to Vbi, the coefficient matrixes A and B are calculated as shown in Equation 5.

$$A = E \qquad \text{[Equation 5]}$$

$$B = \frac{\sum_{i}^{N} Va_i - Vb_i}{N}$$

where, E: Unit matrix

N, i: Integer number meeting $1 \leq i \leq N$

A second method is a method for requiring the coefficient matrix using a single regression analysis. The coefficient matrixes A and B are calculated as shown in Equation 6 using the face feature value vectors Vai and Vbi of N number of persons.

$$A = \frac{Sab}{Saa} \quad \text{[Equation 6]}$$
$$B = \overline{Vb} - \overline{Va}$$

where, N, i: Integer number meeting $1 \leq i \leq N$ $$Saa = \sum_i^N (Va_i - \overline{Va})^2$$

$$Sab = \sum_i^N (Va_i - \overline{Va})(Vb_i - \overline{Vb})$$

$$\overline{Va} = \frac{\sum_i^N Vai}{N}$$

and $$\overline{Vb} = \frac{\sum_i^N Vbi}{N}$$

In addition, as a statistical analysis method, it may be used not only with a single regression analysis but also with other methods such as multiple regression analysis, canonical correlation analysis, etc.

A converter generation function for generating the feature value converter may be mounted in the face identification device or may form a configuration different from the face identification device. In a case of mounting in the face identification device, the converter generation function can use constitutional elements such as the image input section 10, the image storing section 11, the face detecting section 12, the feature point detecting section 13, the face feature value vector extracting section 14.

In the above-mentioned embodiment, a plurality of feature value converters different in conversion characteristics are used in order to generate a plurality of virtual vectors corresponding to a plurality of conditions from the original vector. However, it may be such that parameters of the feature value converter are changed so as to change conversion characteristics and a plurality of the virtual vector is generated using a single feature value converter.

What is claimed is:

1. A face identification device comprising:
a storing unit capable of storing face definition information which defines a face of a registrant;
an identifying unit which performs face identification of a target to be identified by comparing a feature value extracted from a face image of the target to be identified with the face definition information stored in the storing unit; and
a registering unit which generates the face definition information of the registrant and registers the face definition information of the registrant in the storing unit,
wherein the registering unit includes:
a feature value extracting unit which extracts the feature value from a face image of the registrant;
a feature value converting unit which converts a vector of the extracted feature value using a converter which performs coordinate conversion in a feature value space; and
a face definition information generating unit which generates the face definition information of the registrant based on the extracted feature value and a feature value including the vector after conversion,
wherein the feature value converting unit is for converting a vector of a feature value obtained from a face image of the registrant captured under a first condition to a vector of a feature value obtained from a face image of the registrant captured under a second condition that is different from the first condition.

2. The face identification device of claim 1, wherein when the vector before conversion is set to V1 and the vector after conversion is set to V2, the feature value converting unit calculates V2 according to the equation:

$$V2 = A \cdot V1 + B$$

where A and B are coefficient matrices.

3. The face identification device of claim 2, wherein the coefficient matrices are calculated from face images of a plurality of persons using a statistical method.

4. The face identification device of claim 2, wherein the registrant is the i-th person, the vector of the feature value obtained from the face image of the registrant captured under the first condition is set to Vai, and the vector of the feature value obtained from the face image of the registrant captured under the second condition is set to Vbi, and the coefficient matrices A and B are calculated from face images of N number of persons according to the equation:

$$A = E$$

$$B = \frac{\sum_i^N Va_i - Vb_i}{N}$$

where E is a unit matrix and i is an integer that is greater or equal to 1 and greater or less than N.

5. The face identification device of claim 2, wherein the registrant is the i-th person, the vector of the feature value obtained from the face image of the registrant captured under the first condition is set to Vai and the vector of the feature value obtained from the face image imaged under the second condition is set to Vbi, and the coefficient matrices A and B are calculated from face images of N number of persons according to the equation:

$$A = \frac{Sab}{Saa}$$
$$B = \overline{Vb} - \overline{Va}$$

where i is an integer that is greater or equal to 1 and greater or less than N, $$Saa = \sum_i^N (Va_i - \overline{Va})^2,$$

$$Sab = \sum_i^N (Va_i - \overline{Va})(Vb_i - \overline{Vb}),$$

-continued $$\overline{Va} = \frac{\sum_{i}^{N} Vai}{N},$$

and $$\overline{Vb} = \frac{\sum_{i}^{N} Vbi}{N}.$$

6. The face identification device of claim 1, wherein the feature value converting unit converts the vector of the extracted feature value to a plurality of vectors, and
the face definition information generating unit generates the face definition information of the registrant based on the extracted feature value and a feature value including the plurality of vectors after conversion.

7. A method for registering a face of a registrant with a face identification device for performing face identification of a target by comparing a feature value extracted from a face image of the target to be identified with stored face definition information, the face registration method comprising the steps of:
extracting a feature value from a face image of the registrant;
converting a vector of the extracted feature value using a converter which performs coordinate conversion in a feature value space;
generating face definition information of the registrant based on the extracted feature value and a feature value including the vector after conversion using the face identification device; and
registering the generated face definition information in a storing unit capable of storing face definition information which defines a face of a registrant,
wherein the vector of the feature value is obtained from a face image of the registrant captured under a first condition, and the vector of the feature value is converted to a vector of a feature value obtained from a face image of the registrant captured under a second condition that is different from the first condition.

8. A non-transitory computer-readable medium encoded with a computer program for registering a face of a registrant on a face identification device for performing face identification of a target by comparing a feature value extracted from a face image of the target to be identified with stored face definition information, which, when executed by an information processing device, is capable of performing the steps of:
extracting a feature value from a face image of the registrant;
converting a vector of the extracted feature value using a converter which performs coordinate conversion in a feature value space;
generating face definition information of the registrant based on the extracted feature value and a feature value including the vector after conversion; and
registering the generated face definition information in a storing unit capable of storing face definition information which defines a face of a registrant,
wherein the vector of the feature value is obtained from a face image of the registrant captured under a first condition, and the vector of the feature value is converted to a vector of a feature value obtained from a face image of the registrant captured under a second condition that is different from the first condition.

* * * * *